United States Patent [19]

Usui et al.

[11] Patent Number: 4,784,982

[45] Date of Patent: Nov. 15, 1988

[54] COMPOSITE PHYLOSILICATE ADSORBENT AND PROCESS FOR PREPARATION THEREOF

[75] Inventors: Kouichi Usui, Houya; Masahide Ogawa, Shibata; Osamu Okumura, Funabashi; Teiji Sato, Shibata; Kouichi Yamada, Sakura; Masanori Tanaka, Shibata; Noriyuki Takahashi, Nakajo, all of Japan

[73] Assignee: Mizusawa Industrial Chemicals, Ltd., Tokyo, Japan

[21] Appl. No.: 160,706

[22] Filed: Feb. 26, 1988

[30] Foreign Application Priority Data

Feb. 27, 1987 [JP] Japan .................. 62-43073

[51] Int. Cl.⁴ .............. B01J 20/04; B01J 20/08; B01J 20/10
[52] U.S. Cl. .................. 502/410; 502/407; 423/99; 423/118; 423/327
[58] Field of Search .............. 502/407, 410, 238, 250, 502/251; 423/99, 118, 327

[56] References Cited

U.S. PATENT DOCUMENTS

| | | | |
|---|---|---|---|
| 1,999,210 | 4/1935 | Rembert | 502/407 |
| 4,626,420 | 12/1986 | Usui et al. | 423/327 |
| 4,681,749 | 7/1987 | Usui et al. | 423/99 |

FOREIGN PATENT DOCUMENTS 623728  5/1963  Belgium .............. 423/327

*Primary Examiner*—Carl F. Dees
*Attorney, Agent, or Firm*—Spensley Horn Jubas & Lubitz

[57] ABSTRACT

Disclosed is a composite body comprising amorphous and porous silica or silica-alumina and a layer of an aluminum-containing phylosilicate formed on surfaces of primary particles of the silica or silica-alumina. This composite phylosilicate is obtained by reacting a water-soluble silicate, a water-soluble zinc salt or magnesium salt and a water-soluble aluminum salt or aluminate in an aqueous medium containing a sol or gel of silica or silica-alumina. This composite phylosilicate has a large specific surface area and a large pore volume and has both the properties of a solid acid and the properties of a solid base.

17 Claims, 1 Drawing Sheet

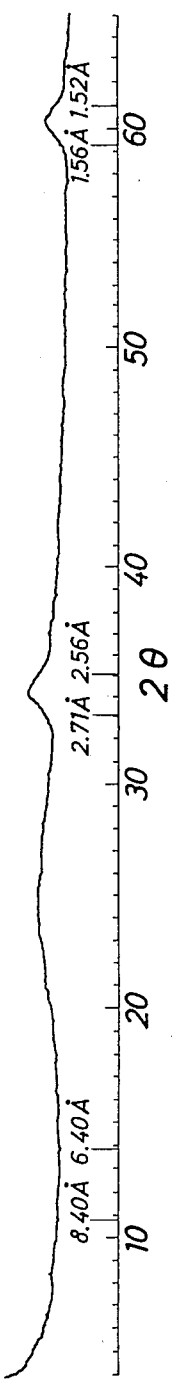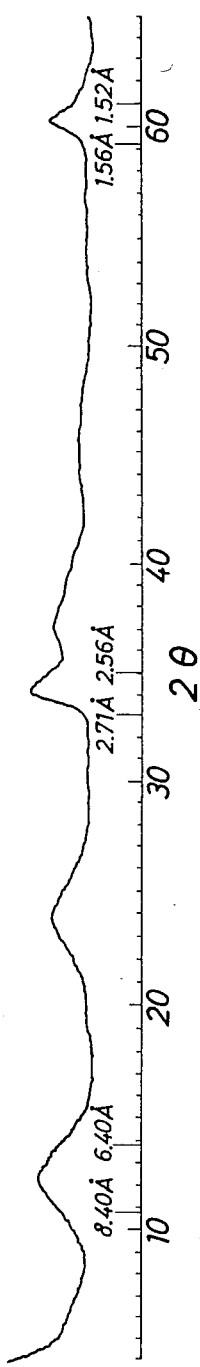

COMPOSITE PHYLOSILICATE ADSORBENT AND PROCESS FOR PREPARATION THEREOF

BACKGROUND OF THE INVENTION (1) Field of the Invention

The present invention relates to a composite phylosilicate and a process for the preparation thereof. More particularly, the present invention relates to a composite phylosilicate which has a large specific surface area and a large pore volume, shows an excellent adsorbing property to various substances and is valuable as an adsorbent or the like.

(2) Description of the Related Art

A phylosilicate generally has, as a basic skeleton, a two-layer or three-layer structure comprising a tetrahedron layer of $SiO_4$ and an octahedron layer of $MO_6$ (in which M stands for zinc or magnesium), which are bonded to each other, and it formed of a great number of such basic skeletons laminated in the direction of the C-axis. Many trials have been made to synthesize phylosilicates having a large specific surface area. For example, Japanese patent application Laid-Open Specification No. 10021/86 teaches that microcrystalline zinc phylosilicate or aluminum-containing zinc phylosilicate having an X-ray diffraction pattern of the fraipontite type and a specific surface area of at least 100 m$^2$/g can be obtained by reacting a water-soluble silicate, a water-soluble zinc salt and a water-soluble aluminum salt and/or a water-soluble aluminate at three-component oxide ratios of $SiO_2$ of 5 to 45 mole%, ZnO of 35 to 65 mole% and $Al_2O_3$ of 1 to 60 mole% in the presence of water.

According to this conventional technique, microcrystalline zinc phylosilicate or aluminum-containing zinc phylosilicate in which crystals are developed in the direction of the C-axis more finely than in natural fraipontite and the specific surface is about 200 m$^2$/g is obtained. However, from the viewpoint of increasing the property of adsorbing a dye or pigment, development of a phylosilicate having a larger specific surface area and a large pore volume is desired.

It is expected that if a mineral having the basic skeleton of the phylosilicate, in which lamination of the basic skeletons in the direction of the C-axis is prevented, is synthesized, it will become possible to obtain a synthetic mineral having a drastically increased specific surface area. However, according to the conventional techniques, it is still impossible to prevent lamination in the direction of the C-axis.

SUMMARY OF THE INVENTION

We found that if synthesis of an aluminum-containing phylosilicate is carried out in an aqueous dispersion containing a dispersion of a sol or gel of silica or silica-alumina, a layer of an aluminum-containing phylosilicate having substantially one layer of the basic skeleton is formed on the surface of amorphous and porous silica or silica-alumina and a synthetic mineral having extremely increased specific surface area and pore volume is obtained. We have now completed the present invention based on this finding.

More specifically, in accordance with one aspect of the present invention, there is provided a composite phylosilicate comprising amorphous and porous silica or silica-alumina and a layer of an aluminum-containing phylosilicate formed on surfaces of primary particles of said silica or silica-alumina and having, as a whole, a chemical composition represented by three-component oxide molar ratios of $SiO_2$ of 5 to 80 mole%, MO (M stands for an atom selected from the group consisting or zinc and magnesium) of 5 to 65 mole% and $Al_2O_3$ of 1 to 60 mole%, an X-ray diffraction pattern in which there is no substantial peak at a spacing dx of 8.40 to 6.40 Å and there are peaks at a spacing dx of 2.71 to 2.56 Å and a spacing dx of 1.56 to 1.52 Å, a specific surface area of at least 200 m$^2$/g, and a pore volume of at least 0.25 ml/g in pores having a pore diameter of 10 to 300 Å.

In accordance with another aspect of the present invention, there is provided a process for the preparation of a composite phylosilicate comprising amorphous and porous silica or silica-alumina and a layer of an aluminum-containing phylosilicate formed on surfaces of primary particles of said silica or silica-alumina as the carrier, said process comprising adding a water-soluble silicate, a water-soluble zinc salt and/or a water-soluble magnesium salt, and a water-soluble aluminum salt and/or a water-soluble aluminate to an aqueous medium containing a dispersion of a sol or gel of silica or silica-alumina to produce, as a whole, a chemical composition represented by three-component oxide molar ratios of $SiO_2$ of 5 to 80 mole%, MO (M stands for an atom selected from the group consisting of zinc and magnesium) of 5 to 65 mole% and $Al_2O_3$ of 1 to 60 mole%, and reacting the added salts in the presence of said silica or silica-alumina.

BRIEF DESCRIPTION OF THE DRAWINGS

FIG. 1 shows an X-ray diffraction spectrum by Cu-K rays of the composite phylosilicate (amorphous silica/aluminum-containing zinc phylosilicate) obtained in Example 1 given hereinafter.

FIG. 2 shows an X-ray diffraction spectrum by Cu-K rays of a typical synthetic fraipontite.

DETAILED DESCRIPTION OF THE PREFERRED EMBODIMENTS

The composite phylosilicate of the present invention comprises amorphous and porous silica or silica-alumina and a layer of an aluminum-containing phylosilicate formed on the surface of the silica or silica-alumina.

This aluminum-containing phylosilicate has as the basic skeleton a two-layer structure comprising a layer of a tetrahedron of $SiO_4$ and a layer of an octahedron of $MO_6$ (in which M stands for an atom selected from the group consisting of zinc and magnesium), which are bonded to each other, and a part of Si of the tetrahedron layer of $SiO_4$ is replaced by Al and in correspondence to this substitution, a part of M of the octahedron layer of $MO_6$ is replaced by Al.

Of two-layer phylosilicates of this type, a mineral in which the metal M is zinc is known as fraipontite. As the basic chemical structure of this mineral is represented by the following formula:

$$(Zn_{3-x}Al_x)(Si_{2-x}Al_x)O_5(OH)_4 \tag{1}$$

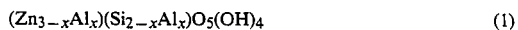

wherein x is a number of from 0.1 to 1.75.

FIG. 2 of the accompanying drawings shows an X-ray diffraction pattern of a typical synthetic fraipontite.

The basic skeleton of the composite phylosilicate of the present invention is the same as that of fraipontite but is prominently characteristic over fraipontite in that lamination of the basic skeletons in the direction of the C-axis is substantially prevented and the basic skeleton is present substantially in the state of a single layer on surfaces of primary particles of porous silica or silica-alumina.

The fact that in this composite phylosilicate, the phylosilicate is present substantially in the form of a single layer of the basic skeleton can be X-ray diffractometrically confirmed. Namely, in the X-ray diffraction pattern of the composite phylosilicate of the present invention, there is present no substantial peak at a spacing dk of 8.40 to 6.40 Å and there are present weak peaks at a spacing dx of 2.71 to 2.56 Å and a spacing dx of 1.56 to 1.52 Å.

FIG. 1 shows an X-ray diffraction pattern of the composite phylosilicate of the present invention (amorphous silica/aluminum-containing zinc phylosilicate composite). When FIG. 1 is compared with FIG. 2, it is seen that in the composite phylosilicate of the present invention, a diffraction peak of (001) plane, (002) plane, (131) plane or (202) plane, attributed to lamination in the direction of the C-axis, is not present but only diffraction peaks of (130) plane and (060) plane, attributed to the lattice of ab plane, are present. Accordingly, it is obvious that the composite phylosilicate of the present invention is surprisingly characterized in that a single layer of the basic skeleton of the phylosilicate is formed on surfaces of primary particles of porous silica or silica-alumina.

In the composite phylosilicate of the present invention, the divalent metal M in the phylosilicate can be zinc alone, magnesium alone or a combination of zinc and magnesium, but when the three-component composition is referred to, the combination of zinc and magnesium is calculated as one component.

The composite phylosilicate of the present invention has such a chemical composition, based on oxides of three components, that the content of $SiO_2$ (contained in silica or silica-alumina and in the phylosilicate) is 5 to 80 mole%, preferably 25 to 75 mole%, the content of MO (M is Zn or Mg) is 5 to 65 mole%, preferably 15 to 60 mole%, and the content of $Al_2O_3$ (contained in alumina-silica and in the phylosilicate) is 1 to 60 mole%, preferably 2 to 50 mole%. The divalent metal M is preferably zinc alone or a combination comprising zinc and magnesium at an atomic ratio of from 95/5 to 50/50, especially from 90/10 to 70/30. If zinc and magnesium are integrated into the composite phylosilicate at the above-mentioned atomic ratio, the specific surface area is prominently increased.

Since the composite phylosilicate of the present invention has the above-mentioned microstructure, the specific surface area and pore volume are drastically increased. Namely, the BET specific surface area is at least 200 m$^2$/g, especially at least 250 m$^2$/g, and the pore volume in pores having a pore diameter of 10 to 300 Å is at least 0.25 ml/g, especially at least 0.30 ml/g.

Since the composite phylosilicate of the present invention is a synthetic mineral, the composite phylosilicate is excellent in the whiteness, and in general, the Hunter whiteness is higher than 90%.

In the preparation of the above-mentioned composite phylosilicate, a water-soluble silicate, a water-soluble zinc salt and/or a water-soluble magnesium salt, and a water-soluble aluminum salt and/or a water-soluble aluminate are added to an aqueous medium containing a dispersion of a sol or gel of silica or silica-alumina so that the above-mentioned chemical composition is produced, and the added salts are reacted in the presence of said silica or silica-alumina.

In the process of the present invention, the phylosilicate is formed in the form of a single layer of the basic skeleton by reacting the above-mentioned salts in the presence of a dispersion of a sol or gel of silica or silica-alumina. The reason is considered to be as follows.

As is taught in the above-mentioned conventional technique, the phylosilicate of the basic structure is first formed by double decomposition of the salts, and this basic structure has a negative charge based on the silica layer and a positive charge based on the metal oxide layer. Accordingly, it is considered that such basic structures are laminated by an electrostatic force generated between the basic structures to form a stably grown crystal.

In contrast, if the respective salts are reacted in an aqueous medium containing a dispersion of a sol or gel of silica or silica-alumina according to the present invention, the formed basic structure of the phylosilicate is caught on surfaces of negatively charged porous silica or silica-alumina particles and the composite phylosilicate is prepared while preventing lamination of the basic structures.

An alkali metal silicate such as sodium silicate is used as the water-soluble silicate, and sodium silicate in which the $SiO_2/Na_2O$ molar ratio is in the range of from 1/1 to 5/1 is advantageously used. As the water-soluble zinc or magnesium salt, there can be used zinc chloride, zinc sulfate, zinc nitrate, magnesium chloride, magnesium sulfate and magnesium nitrate. As the aluminum component, there can be used sodium aluminate and water-soluble aluminum salts such as aluminum chloride, aluminum sulfate and aluminum nitrate.

As the aqueous medium containing a dispersion of a sol or gel of silica or silica-alumina, there can be used a dispersion obtained by dispersing or deflocculating in an aqueous medium an acidic sol of silica obtained by neutralizing sodium silicate with a mineral acid or a hydrogel of silica by gelling this acidic sol of silica. This silica sol or gel dispersion can contain $Al_2O_3$ in an amount of up to 80% by weight, especially up to 60% by weight, based on $SiO_2$. It is preferred that the silica or silica-alumina sol or gel dispersion used in the present invention should have a specific surface area of at least 200 m$^2$/g, especially at least 400 m$^2$/g, in the dry state.

It also is preferred that the silica or silica-alumina sol or gel dispersion be used in an amount of 10 to 70% by weight, especially 20 to 50% by weight, as the solids based on the final composite phylosilicate. If the amount of the dispersion is too small and below this range, lamination of basic structures is not effectively prevented and it is difficult to sufficiently increase the specific surface area or pore volume. If the amount of the dispersion is too large and exceeds the abovementioned range, the concentration of the basic structure of the phylosilicate acting effectively for adsorption is lowered. It is preferred that the solid concentration of silica or silica-alumina in the aqueous medium be 1 to 20% by weight, especially 3 to 10% by weight.

It is preferred that the respective salts be added in the form of aqueous solutions, and in order to perform the double decomposition reaction homogeneously, there is advantageously adopted a method in which the reaction is effected by simultaneously adding the silicate, the zinc salt and/or magnesium salt and the aluminum salt and/or aluminate to an aqueous medium containing silica or silica-alumina.

The double decomposition reaction is sufficiently advanced at room temperature, but of course, the reaction can be carried out under heating at a temperature of up to about 100° C. It is preferred that the pH value of the reaction mixture be 5 to 10, especially 6 to 8. If necessary, an acid or alkali is added to the reaction mixture to maintain the pH value within the above-mentioned range. After the reaction, the mother liquor can be subjected to an aging treatment, if necessary. The formed precipitate is recovered by filtration and subjected to post treatments such as water washing, drying, pulverization and sieving to obtain an intended product.

The composite phylosilicate of the present invention has a large specific surface area and a large pore volume and has both the properties of a solid acid and the properties of a solid base, inherently to a phylosilicate having a two-layer structure. Accordingly, the composite phylosilicate of the present invention is advantageously used as an adsorbent for adsorbing acidic or basic substances in the form of liquids or solutions.

The present invention will now be described in detail with reference to the following examples that by no means limit the scope of the present invention.

The properties referred to in the examples were determined according to the following methods.

1. X-Ray Diffractometry

The X-ray diffractometry was carried out by using an X-ray diffraction apparatus supplied by Rigaku Denki K.K. (X-ray generator 4036A1, goniometer 2125D1 and counter 5071) under the following conditions.

Target: Cu
Filter: Ni
Detector: SC
Voltage: 35 kVp
Current: 15 mA
Full Scale of Counter: 8000 c/s
Time Constant: 1 second
Scanning Speed: 2°/mm
Chart Speed: 2 cm/mm
Irradiation Angle: 1°
Slit Width: 0.3 mm
Illumination Angle: 6°

2. Hunter Whiteness

The Hunter whiteness was measured by using an automatic reflectometer, Model TR-600 supplied by Tokyo Denshoku K.K.

3. BET Specific Area (SA)

The specific surface area of each powder was measured based on adsorption of nitrogen gas by the so-called BET method. This method is explained in detail in S. Brunauer, P. H. Emmett and E. Teller, J. Am. Chem. Soc., 60, 309 (1938).

Namely, 0.5 to 0.6 g of a sample dried at 150° C. in advance was charged in a weighing bottle and was then dried for 1 hour in a thermostat drier maintained at 150° C., and immediately, the weight was precisely measured. The sample was charged in an adsorption sample tube and heated at 150° C., and the adsorption sample tube was deaerated until the vacuum degree in the adsorption sample tube became $10^{-4}$ mmHg. The adsorption sample tube was naturally cooled and was then placed in liquefied nitrogen at $-196°$ C., and the amount adsorbed of $N_2$ gas at 4 to 5 points was measured within the following range:

$$PN_2/P_0 = 0.05 \text{ to } 0.30$$

wherein $PN_2$ stands for the pressure of nitrogen gas and $P_0$ stands for the atmospheric pressure at the measurement. The adsorption quantity of $N_2$, from which the dead volume was subtracted, was converted to the adsorption quantity at 0° C. under 1 atmosphere, and the obtained adsorption quantity was substituted into the BET equation, and $Vm$ (cc/g) (the adsorption quantity of nitrogen gas necessary for formation of a monomolecular layer on the sample surface) was determined. The specific surface area (SA) was calculated according to the following formula:

$$SA = 4.35 \times Vm (m^2/g)$$

4. Pore Volume (PV)

The adsorption quantity of $N_2$ gas was determined by the same apparatus in the same manner as described above with respect to the measurement of the BET specific surface area. Namely, the adsorption quantity of $N_2$ gas at $-196°$ C. was measured over the range of $PN_2/P_0 = 0.05$ to 0.97, and the adsorption isotherm was obtained by plotting the converted adsorption quantity of $N_2$ gas at 0° C. under 1 atmosphere on the ordinate and $PN_2/P_0$ on the abscissa. Then, $PN_2/P_0$ of the adsorption isotherm was converted to the pore radius by using the following Kelvin equation:

$$l_n(PN_2/P_0) = -2\gamma V_L \cos \theta / rRT$$

wherein r stands for the pore radius, $\gamma$ stands for the surface tension, $V_L$ stands for the molar volume and $\theta$ stands for the contact angle. Then, the $N_2$ adsorption quantity $\Delta V$ (cc/g) of pores having a pore radius of from 25 to 300 Å was determined, and the pore volume (PV) was calculated according to the following formula:

$$PV = 1.55 \times 10^{-3} \times \Delta V (cc/g)$$

5. Methylene Blue Adsorbability

An Erlenmeyer flask having a capacity of 200 ml and being provided with a common plug was charged with 100 ml of a 0.1% aqueous solution of Methylene Blue, and 2 g of the sample was added to the solution. The solution was shaken for 5 hours by a shaker (the amplitude was 45 mm in the horizontal direction and the frequency was 250 reciprocations per minute) and allowed to stand still at room temperature, and the transparency and hue of the supernatant were examined with the naked eye.

6. Naphthol Yellow S Adsorbability

An Erlenmeyer flask having a capacity of 200 m and being provided with a common plug was charged with 100 m of a 0.1% aqueous solution of Naphthol Yellow S, and 2 g of the sample was added to the solution. The solution was shaken for 5 hours by a shaker (the amplitude was 45 mm in the horizontal direction and the frequency was 250 reciprocations per minute) and allowed to stand still at room temperature. The transparency and hue of the supernatant were examined with the naked eye.

The dye adsorbability was evaluated according to the following scale.

○ : the powder was colored with the dye and the supernatant was substantially colorless and transparent
◯ : the powder was colored with the dye and the hue of the dye was left in the supernatant
X: the powder was not colored with the dye and no change was observed in the hue of the supernatant

EXAMPLE 1

A silica sol prepared by conducting neutralization reaction between 330 g of sodium silicate No. 3 ($SiO_2=22.0\%$, $Na_2O=7.0\%$) and about 80 g of 35% hydrochloric acid under an acidic condition of a pH value of 2 to 4 was gelled by heating, and the formed gel was washed with water to obtain a silica hydrogel. The obtained hydrogel was disintegrated in water by a household mixer to obtain an amorphous silica slurry ($SiO_2=4.8\%$) (first step).

Separately, 205 g of sodium silicate No. 3 and 221 g of sodium hydroxide (NaOH=5.5 moles) were dissolved in water so that the total amount was 1 l, whereby a liquid A-1 ($SiO_2=0.75$ mole) was obtained. Separately, 180 g of zinc chloride (anhydride) and 241 g of aluminum chloride (hexahydrate) were dissolved in water so that the total amount was 1 l, whereby a liquid B-1 (ZnO=1.2 moles, $Al_2O_3=0.6$ mole) was obtained. A beaker having a capacity of 5 l was charged with 1.5 kg of the silica slurry ($SiO_2=1.2$ moles) obtained at the first step as the dispersion, and the liquids A-1 and B-1 were simultaneously poured at a rate of 25 ml/min into the dispersion with stirring while maintaining the liquid temperature at 40° C. At the time of termination of pouring, the pH value of the reaction liquid was about 7.2. The reaction mixture was further stirred and aged for 1 hour. The reaction liquid was suction-filtered, and the recovered solid was washed with water and dried at 110° C. The obtained cake was pulverized by a small impact pulverizer (sample mill) to obtain a white fine powder (second step).

EXAMPLE 2

In water were dissolved 245 g of sodium silicate No. 3 ($SiO_2=22.0\%$, $Na_2O=7.0\%$) and 112 g of sodium hydroxide (NaOH=2.8 moles) so that the total amount was 1 l, whereby a liquid A-2 ($SiO_2=0.9$ mole) was obtained. Separately, 191 g of zinc chloride (anhydride) and 48 g of aluminum chloride (hexahydrate) were dissolved in water so that the total amount was 1 l, whereby a liquid B-2 (ZnO=1.4 mole, $Al_2O_3=0.1$ mole) was obtained. A beaker having a capacity of 5 l was charged with 1.13 kg of the same silica slurry ($SiO_2=0.9$ mole) as prepared at the first step of Example 1 as the dispersion, and the liquids A-2 and B-2 were simultaneously poured at a rate of 25 ml/min into the dispersion with stirring while maintaining the liquid temperature at 40° C. At the time of termination of pouring, the pH value of the reaction liquid was about 7.6. The reaction liquid was further stirred and aged for 1 hour. The reaction liquid was suction-filtered, and the recovered solid was washed with water and dried at 110° C. The obtained cake was pulverized by a small impact pulverizer (sample mill) to obtain a white fine powder.

EXAMPLE 3

To a silica sol prepared by conducting nuetralization reaction between 275 g of sodium silicate No. 3 ($SiO_2=22.0\%$, $Na_2O=7.0\%$) and about 35 g of 98% sulfuric acid under an acidic condition of a pH value of 2 to 3 was added 177 g of a basic aluminum sulfate sol ($Al_2O_3=8.1\%$), and the mixed liquid was gelled by heating, and the formed gel was washed with water to obtain a silica-alumina hydrogel. The obtained hydrogel was disintegrated in water by a household mixer to obtain an amorphous silica-alumina slurry ($SiO_2=3.2\%$, $Al_2O_3=0.7\%$) (first step).

Separately, 205 g of sodium silicate No. 3 and 220 g of sodium hydroxide (NaOH=5.5 moles) were dissolved in water so that the total amount was 1 l, whereby a liquid A-3 ($SiO_2=0.75$ mole) was obtained. Furthermore, 180 g of zinc chloride (anhydride) and 290 g of aluminum chloride (hexahydrate) were dissolved in water so that the total amount was 1 l, whereby a liquid B-3 (ZnO=1.2 moles, $Al_2O_3=0.6$ mole) was obtained. A beaker having a capacity of 5 l was charged with 1.8 kg of the silica-alumina slurry ($SiO_2=1.0$ mole, $Al_2O_3=0.1$ mole) obtained at the first step, and the liquids A-3 and B-3 were simultaneously poured at a rate of 25 ml/min into the dispersion with stirring while maintaining the liquid temperature at 40° C. At the time of termination of pouring, the pH value of the reaction liquid was about 7.3. The reaction liquid was further stirred and aged for 1 hour. The reaction liquid was suction-filtered, and the recovered solid was washed with water and dried at 110° C. The obtained cake was pulverized by a small impact pulverizer (sample mill) to obtain a white fine powder.

EXAMPLE 4

In water were dissolved 165 g of sodium silicate No. 3 ($SiO_2=22.0\%$, $Na_2O=7.0\%$) and 320 g of sodium hydroxide (NaOH=8.0 moles) so that the total amount was 1 l, whereby a liquid A-4 ($SiO_2=0.6$ mole) was obtained. Separately, 180 g of zinc chloride (anhydride) and 480 g of aluminum chloride (hexahydrate) were dissolved in water so that the total amount was 1 l, whereby a liquid B-4 (ZnO=1.2 moles, $Al_2O_3=1.0$ mole) was obtained. A beaker having a capacity of 5 l was charged with 2.25 kg of the same silica-alumina slurry ($SiO_2=1.2$ moles, $Al_2O_3=0.1$ mole) as prepared at the first step of Example 3 as the dispersion, and the liquids A-4 and B-4 were simultaneously poured at a rate of 25 ml/min into the dispersion with stirring while maintaining the liquid temperature at 40° C. At the time of termination of pouring, the pH value of the reaction liquid was about 6.4. The reaction liquid was further stirred and aged for 1 hour. The reaction liquid was suction-filtered, and the recovered solid was washed with water and dried at 110° C. The obtained cake was pulverized by a small impact pulverizer (sample mill) to obtain a white fine powder.

EXAMPLE 5

In water were dissolved 191 g of sodium silicate No. 3 ($SiO_2=22.0\%$, $Na_2O=7.0\%$) and 160 g of sodium hydroxide (NaOH=4.0 moles) so that the total amount was 1 l, whereby a liquid A-5 ($SiO_2=0.7$ mole) was formed. Separately, 180 g of zinc chloride (anhydride), 145 g of aluminum chloride (hexahydrate) and 24 g of magnesium chloride (hexahydrate) were dissolved in water so that the total amount was 1 l, whereby a liquid B-5 (ZnO=1.2 moles, $Al_2O_3=0.3$ mole, MgO=0.1 mole) was obtained. A beaker having a capacity of 5 l was charged with 1.0 kg of the same silica slurry ($SiO_2=0.8$ mole) as prepared at the first step of Example 1 as the dispersion, and the liquids A-5 and B-5 were simultaneously poured at a rate of 25 ml/min into the dispersion with stirring while maintaining the liquid temperature at 40° C. At the time of termination of pouring, the pH value of the reaction liquid was 8.2. The reaction liquid was further stirred and aged for 1 hour. The reaction liquid was suction-filtered, and the recovered solid was washed with water and dried at 110° C. The obtained cake was pulverized by a small impact pulverizer (sample mill) to obtain a white fine powder.

EXAMPLE 6

A white fine powder was obtained in the same manner as described in Example 5 except that the composition of the liquid B-5 was changed to a composition comprising 0.7 mole of ZnO, 0.3 mole of $Al_2O_3$ and 0.6 mole of MgO.

EXAMPLE 7

A white fine powder was obtained in the same manner as described in Example 1 except that the concentration of the silica slurry obtained as the dispersion at the first step of Example 1 was changed to 17% as $SiO_2$.

EXAMPLE 8

A white fine powder was obtained in the same manner as described in Example 3 except that a slurry ($SiO_2$=0.45 mole, $Al_2O_3$=0.75 mole) of silica-alumina having an $Al_2O_3$ content of 73.9% was used as the dispersion, a liquid A-3 containing 0.70 mole of $SiO_2$ was used and a liquid B-3 containing 1.0 mole of ZnO and 0.85 mole of $Al_2O_3$ was used.

EXAMPLE 9

A white fine powder was used in the same manner as described in Example 8 except that the silica-alumina slurry was used in an amount 2.5 times the amount used in Example 8.

COMPARATIVE EXAMPLE 1

A cake ($SiO_2$=0.5 mole, $Al_2O_3$=0.2 mole, ZnO=0.72 mole) of aluminum-containing zinc phylosilicate of the fraipontite type having a BET specific surface area of 140 m²/g, which was obtained according to the procedures described in Example 10 of Japanese patent application Laid-Open Specification No. 275127/86 was homogeneously mixed with the silica-alumina slurry ($SiO_2$=1.0 mole, $Al_2O_3$=0.1 mole) obtained at the first step of Example 3 by using a household mixer. Then, a white fine powder was prepared from this mixture by conducting filtration, water washing and drying at 110° C. according to the procedures described in Example 1.

COMPARATIVE EXAMPLE 2

A white fine powder was obtained in the same manner as described in Example 1 except that the amount used of the silica slurry obtained at the first step of Example 1 was changed to 10.8 kg ($SiO_2$=8.7 moles).

COMPARATIVE EXAMPLE 3

A white fine powder was prepared in the same manner as described in Example 3 except that the amount used of the silica-alumina slurry obtained at the first step of Example 3 was changed to 0.54 kg ($SiO_2$=0.3 mole, $Al_2O_3$=0.03 mole).

COMPARATIVE EXAMPLE 4

A white fine powder was prepared in the same manner as described in Example 1 except that the concentration of the silica slurry obtained at the first step of Example 1 was changed to 0.5% by weight as $SiO_2$.

COMPARATIVE EXAMPLE 5

A white fine powder was prepared in the same manner as described in Example 3 except that the concentration of the silica-alumina slurry obtained at the first step of Example 3 was changed to 22% by weight as $SiO_2.Al_2O_3$.

With respect to each of Examples 1 through 9 and Comparative Examples 1 through 5 described above, data of the solid concentration of the silica or silica-alumina dispersion based on the composite phylosilicate, the solid concentration in the slurry as the dispersion, the composition of the composite phylosilicate, the Hunter whiteness, the BET specific surface area, the pore volume, the Methylene Blue adsorbability and the Naphthol Yellow S adsorbability are shown in Table 1.

Incidentally, in Table 1, the solid weight of the composite phylosilicate is the sum of oxides, that is, $SiO_2$, $Al_2O_3$, ZnO and MgO.

TABLE 1

| Ex. CEx. | Concentration (% by weight) of Slurry as Dispersion | Surface Area (m²/g) of Dispersion in Dry State | Ratio (% by weight) of Solid of Silica or Silica-Alumina Dispersion to Composite Phylo silicate | Composition (mole %) of Composite Phylosilicate | | | |
|---|---|---|---|---|---|---|---|
| | | | | $SiO_2$ | ZnO | $Al_2O_3$ | MgO |
| Ex. 1 | $SiO_2$/4.8 | 430 | 26.1 | 50 | 34 | 16 | 0 |
| Ex. 2 | $SiO_2$/4.8 | 430 | 30.4 | 55 | 42 | 3 | 0 |
| Ex. 3 | $SiO_2$—$Al_2O_3$/3.9 | 380 | 25.6 | 48 | 33 | 19 | 0 |
| Ex. 4 | $SiO_2$—$Al_2O_3$/4.5 | 400 | 36.4 | 44 | 29 | 27 | 0 |
| Ex. 5 | $SiO_2$/4.8 | 430 | 20.0 | 48 | 38 | 10 | 4 |
| Ex. 6 | $SiO_2$/4.8 | 430 | 23.8 | 50 | 20 | 12 | 18 |
| Ex. 7 | $SiO_2$/17 | 260 | 26.1 | 50 | 34 | 16 | 0 |
| Ex. 8 | $SiO_2$—$Al_2O_3$/3.9 | 380 | 32.7 | 31.6 | 26.3 | 42.1 | 0 |
| Ex. 9 | $SiO_2$—$Al_2O_3$/3.9 | 300 | 61.4 | 31.6 | 26.3 | 42.1 | 0 |
| CEx. 1 | $SiO_2$—$Al_2O_3$/3.9 | 380 | 39.2 | 59.5 | 28.5 | 12 | 0 |
| CEx. 2 | $SiO_2$/4.8 | 430 | 71.9 | 84 | 10.6 | 5.4 | 0 |
| CEx. 3 | $SiO_2$—$Al_2O_3$/3.9 | 380 | 9.4 | 36.4 | 41.6 | 22 | 0 |
| CEx. 4 | $SiO_2$/0.5 | 290 | 26.1 | 50 | 34 | 16 | 0 |
| CEx. 5 | $SiO_2$—$Al_2O_3$ | 180 | 25.6 | 48 | 33 | 19 | 0 |

| Ex. CEx. | Hunter Whiteness | BET Surface Area (m²/g) | Pore Volume (cc/g) | Methylene Blue Adsorbability | Naphthol Yellow S Adsorbability |
|---|---|---|---|---|---|
| Ex. 1 | 95 | 290 | 0.43 | ◎ | ◎ |
| Ex. 2 | 93 | 269 | 0.35 | ◎ | ◎ |
| Ex. 3 | 95 | 315 | 0.45 | ◎ | ◎ |

TABLE 1-continued

| | | | | | |
|---|---|---|---|---|---|
| Ex. 4 | 95 | 320 | 0.48 | ⊚ | ⊚ |
| Ex. 5 | 94 | 397 | 0.53 | ⊚ | ⊚ |
| Ex. 6 | 93 | 330 | 0.46 | ⊚ | ⊚ |
| Ex. 7 | 91 | 270 | 0.30 | ⊚ | ⊚ |
| Ex. 8 | 93 | 300 | 0.38 | ⊚ | O |
| Ex. 9 | 94 | 290 | 0.27 | ⊚ | ⊚ |
| CEx. 1 | 95 | 160 | 0.23 | ⊚ | x |
| CEx. 2 | 94 | 195 | 0.20 | ⊚ | x |
| CEx. 3 | 96 | 150 | 0.16 | x | x |
| CEx. 4 | 89 | 185 | 0.20 | O | x |
| CEx. 5 | 92 | 195 | 0.23 | O | x |

Note
*: Ex.: Example, CEx.: Comparative Example

We claim:

1. A composite phylosilicate comprising amorphous and porous silica or silica-alumina and a layer of an aluminum-containing phylosilicate formed on surfaces of primary particles of said silica or silica-alumina and having, as a whole, a chemical composition represented by three-component oxide molar ratios of $SiO_2$ of 5 to 80 mole%, MO (M stands for an atom selected from the group consisting of zinc and magnesium) of 5 to 65 mole% and $Al_2O_3$ of 1 to 60 mole%, an X-ray diffraction pattern in which there is no substantial peak at a spacing dx of 8.40 to 6.40 Å and there are peaks at a spacing dx of 2.71 to 2.56 Å and a spacing dx of 1.56 to 1.52 Å, a specific surface area of at least 200 m²/g, and a pore volume of at least 0.25 cc/g in pores having a pore diameter of 10 to 300 Å.

2. A composite phylosilicate as set forth in claim 1, which has substantially the same X-ray diffraction pattern as that shown in FIG. 1 of the accompanying drawings.

3. A composite phylosilicate as set forth in claim 1, wherein the aluminum-containing phylosilicate is fraipontite.

4. A composite phylosilicate as set forth in claim 1, wherein the aluminum-containing phylosilicate has a chemical structure represented by the following formula:

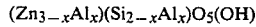

$(Zn_{3-x}Al_x)(Si_{2-x}Al_x)O_5(OH)$ wherein x is a number of from 0.1 to 1.75.

5. A composite phylosilicate as set forth in claim 1, which has, as a whole, a chemical composition represented by three-component oxide molar ratios of $SiO_2$ of 25 to 65 mole%, MO (M is an atom selected from zinc and magnesium) of 15 to 60 mole% and $Al_2O_3$ of 2 to 50 mole%.

6. A composite phylosilicate as set forth in claim 1, wherein the divalent metal M is zinc alone.

7. A composite phylosilicate as set forth in claim 1, wherein the divalent metal M comprises zinc and magnesium at an atomic ratio of from 95/5 to 50/50.

8. A composite phylosilicate as set forth in claim 1, which has a Hunter whiteness higher than 90%.

9. A composite phylosilicate as set forth in claim 1, wherein the amorphous and porous silica or silica-alumina is present in an amount of 10 to 70% by weight based on the whole composite phylosilicate.

10. An adsorbent comprising a composite phylosilicate as set forth in claim 1.

11. A process for the preparation of a composite phylosilicate comprising amorphous and porous silica or silica-alumina and a layer of an aluminum-containing phylosilicate formed on surfaces of primary particles of said silica or silica-alumina as the carrier, said process comprising adding a water-soluble silica silicate, a water-soluble zinc salt and/or a water-soluble magnesium salt, and a water-soluble aluminum salt and/or a water-soluble aluminate to an aqueous medium containing a dispersion of a sol or gel of silica or silica-alumina to produce, as a whole, a chemical composition represented by three-component oxide molar ratios of $SiO_2$ of 5 to 80 mole%, MO (M stands for an atom selected from the group consisting of zinc and magnesium) of 5 to 65 mole% and $Al_2O_3$ of 1 to 60 mole%, and reacting the added salts in the presence of said silica or silica-alumina.

12. A preparation process according to claim 11, wherein the dispersion of the sol or gel of silica or silica-alumina has a specific surface area of at least 200 m²/g in the dry state.

13. A preparation process according to claim 11, wherein the dispersion of the sol or gel of silica-alumina contains up to 80% by weight of $Al_2O_3$.

14. A preparation process according to claim 11, wherein the dispersion of the sol or gel of silica or silica-alumina is used as an amount of 10 to 70% by weight based on the composite phylosilicate.

15. A preparation process according to claim 11, wherein the solid concentration of silica or silica-alumina in the aqueous medium is 1 to 20% by weight.

16. A preparation process according to claim 11, wherein the reaction is carried out at a temperature in the range of from room temperature to 100° C.

17. A preparation process according to claim 11, wherein the reaction is carried out at a pH value of from 5 to 10.

* * * * *